US008955797B2

(12) United States Patent
Buono et al.

(10) Patent No.: US 8,955,797 B2
(45) Date of Patent: Feb. 17, 2015

(54) PROPULSION AND MOTION-TRANSMISSION ASSEMBLY, IN PARTICULAR FOR A ROTARY-WING AIRCRAFT

(75) Inventors: Fabrizio Buono, Carmagnola (IT); Stefano Cini, Santena (IT)

(73) Assignee: Tecnocad Progetti S.p.A., Turin (IT)

( * ) Notice: Subject to any disclaimer, the term of this patent is extended or adjusted under 35 U.S.C. 154(b) by 172 days.

(21) Appl. No.: 13/817,427

(22) PCT Filed: Jul. 19, 2011

(86) PCT No.: PCT/IB2011/053207
§ 371 (c)(1),
(2), (4) Date: Apr. 3, 2013

(87) PCT Pub. No.: WO2012/023065
PCT Pub. Date: Feb. 23, 2012

(65) Prior Publication Data
US 2013/0183169 A1   Jul. 18, 2013

(30) Foreign Application Priority Data
Aug. 16, 2010  (IT) .............................. TO2010A0703

(51) Int. Cl.
*B64D 35/00* (2006.01)
*F04B 9/08* (2006.01)
(Continued)

(52) U.S. Cl.
CPC . *F04B 9/08* (2013.01); *B64C 27/10* (2013.01); *B64C 27/12* (2013.01); *B64D 27/24* (2013.01); *Y02T 50/44* (2013.01); *Y02T 50/62* (2013.01)
USPC .......................................... 244/60; 244/53 R

(58) Field of Classification Search
CPC ............... B64C 2700/6281; B64C 2700/6288; B64C 27/12; B64C 27/24; B64D 35/00

USPC .................................................. 244/60, 53 R
See application file for complete search history.

(56) References Cited

U.S. PATENT DOCUMENTS 3,211,399 A  * 10/1965  Eickmann .................. 244/17.23
3,245,637 A  *  4/1966  Eickmann ......................... 244/2
(Continued)

OTHER PUBLICATIONS

International Search Report and Written Opinion, dated Nov. 25, 2011 for International Application No. PCT/IB2011/053207, 11 pages.

*Primary Examiner* — Isam Alsomiri
*Assistant Examiner* — Justin Benedik
(74) *Attorney, Agent, or Firm* — Patterson & Sheridan, LLP

(57) ABSTRACT

A propulsion and motion-transmission assembly (1), in particular for a rotary-wing aircraft, the assembly (1) comprising:—a first hydrostatic transmission (2) including a first fluid machine for converting mechanical energy into fluid energy (18) and a first fluid machine for converting fluid energy into mechanical energy (26);—a second hydrostatic transmission (8) including a second fluid machine for converting mechanical energy into fluid energy (62) and a second fluid machine for converting fluid energy into mechanical energy (70); and wherein each of said first and second hydrostatic transmissions (2, 8) comprises a high-pressure branch (24, 68) and a low-pressure branch (30, 74), which, in each of said first and second hydrostatic transmissions (2, 8), hydraulically connect the fluid machine. The assembly (1) further comprises valve means (108, 112) that can be actuated for enabling a first hydraulic connection (106) between the low-pressure branch (30) of the first hydrostatic transmission (2) and the low-pressure branch (74) of the second hydrostatic transmission (8).

10 Claims, 2 Drawing Sheets

(51) Int. Cl.
*B64C 27/10* (2006.01)
*B64C 27/12* (2006.01)
*B64D 27/24* (2006.01)

(56) References Cited

U.S. PATENT DOCUMENTS

| | | | | |
|---|---|---|---|---|
| 3,253,806 A | * | 5/1966 | Eickmann | 244/17.23 |
| 3,253,807 A | * | 5/1966 | Eickmann | 244/17.23 |
| 3,260,479 A | * | 7/1966 | Eickmann | 244/17.13 |
| 3,345,016 A | * | 10/1967 | Eickmann | 244/17.23 |
| 3,614,029 A | * | 10/1971 | Eickmann | 244/17.23 |
| 3,823,898 A | * | 7/1974 | Eickmann | 244/55 |
| 4,009,849 A | * | 3/1977 | Eickmann | 244/53 R |
| 4,173,321 A | * | 11/1979 | Eickmann | 244/17.23 |
| 4,488,692 A | * | 12/1984 | Eickmann | 244/55 |
| 7,243,755 B2 | * | 7/2007 | Legner | 180/307 |

\* cited by examiner

PROPULSION AND MOTION-TRANSMISSION ASSEMBLY, IN PARTICULAR FOR A ROTARY-WING AIRCRAFT

FIELD OF THE INVENTION

The present invention relates to a propulsion and motion-transmission assembly for rotary-wing aircrafts such as helicopters or land vehicles equipped with flight modules.

DESCRIPTION OF THE PRIOR ART AND GENERAL TECHNICAL PROBLEM

Rotary-wing aircrafts find use in various civilian and military applications owing to their considerable versatility and their capacity of performing manoeuvres otherwise impossible with fixed-wing aircraft.

In the technical field of rotary-wing flight, the most common choice for propulsion and motion-transmission assemblies is to adopt a fluid machine, for example a reciprocating internal-combustion engine or a gas turbine, coupled to a mechanical transmission connected to a rotor.

However, especially in aircrafts in which propulsion is entrusted to a single gas turbine, in the case where the latter ceases to function on account of a failure, the consequent rapid descent of the aircraft to the ground can be governed only thanks to the autorotation of the rotor.

To guarantee the safety of the occupants of the aircraft even in the case of failure, the propulsion assemblies generally comprise two or more motor units connected to the rotor, the power of which is oversized with respect to the requirements of normal flight in such a way that, in the case of failure of one of them, the motor unit that is still functioning is able to maintain the aircraft in flight making up for the failure of delivery of power by the failed motor unit.

It is, however, not always possible to have available a redundant propulsion assembly, since on many aircraft for reasons linked to the reduction of the weight and dimensions it is generally impossible to install more than one motor unit. In this case, in the event of a failure the only possibility of controlling the aircraft depends, as mentioned, upon autorotation of the rotor. For this reason, in fact, flying over population centres with single-turbine helicopters is forbidden by specific rules.

In the case where, moreover, the rotary-wing aircraft is not a helicopter of a traditional type but a vehicle equipped with wheels for advancing on the ground and to which a flight module has been applied (vehicles of this type are known, for example, from documents GB-A-908691 and GB-A-938686), it is evident that, in addition to the requirements of redundancy typical of any aeronautics application, the need to contain the weights and to provide a system that is as compact as possible and can be easily installed assumes still greater importance.

It should moreover not be forgotten that the choice that is today common to almost all rotary-wing aircraft is that of the adoption of gas turbines as motor units, which leads to a well known series of problems in the regulation. In general, on account of the difficulty of regulation of gas turbines, the variation of the lift of the blades of the rotor is generally obtained by means of variation of the collective pitch rather than via variation of the r.p.m. of the turbine (or turbines), which substantially works (work) at a fixed r.p.m. This poses a constraint on the maximum speed of translation of the aircraft, since, as is known to the person skilled in the branch, in conditions of transonic flow of the fluid current with respect to the blade there occur dangerous vibrational phenomena (transonic flutter). Since the relative velocity between the fluid current and the blade in any point of the blade itself is equal to the vector sum of the tangential velocity of the blade due to the motion of rotation and of the speed of translation of the aircraft, it is evident that the most critical point is the periphery of the blade, in particular in a position where the two velocities mentioned above have vectors parallel and having the same direction. In fact, whereas the speed of translation is uniform on the entire rotor, the tangential velocity is maximum at the periphery of the blade this being at the maximum distance from the axis of rotation of the rotor. The limit velocity of translation of the aircraft is that whereby the flow at the periphery of the blade occurs in conditions at the limit of the transonic regime, in particular at Mach 0.9 (approximately).

In addition, a transmission of mechanical type arranged between one or more gas turbines and the rotor inevitably entails the disadvantage of the dynamic coupling with the rotors, which implies that all the harmonic motions of the rotors result in similar oscillations in the operation of the transmission and of the gas turbine itself (or of the gas turbines, if more than one are present), with evident irregularities of operation, which, if not countered, can lead to premature wear of the components.

Finally, a mechanical transmission poses considerable constraints from the standpoint of the arrangement of the components. It is evident that the use, for example, of rigid transmission shafts imposes to provide within the aircraft spaces of equal extension capable of accommodating them, where the aforesaid spaces will necessarily have to reproduce the geometry of the mechanical transmission.

OBJECT OF THE INVENTION

The object of the present invention is to overcome the technical problems described above.

In particular, the object of the present invention is that of providing a propulsion and motion-transmission assembly for a rotary-wing aircraft that is first of all redundant to guarantee maximum safety in the event of failure, that is feasible in regulation, and presents few constraints in terms of arrangement of the components.

SUMMARY OF THE INVENTION

The object of the present invention is achieved by a propulsion and motion-transmission assembly for a rotary-wing aircraft having the features forming the subject of the ensuing claims, which form an integral part of the technical disclosure herein provided in relation to the invention.

BRIEF DESCRIPTION OF THE DRAWINGS

The invention will now be described with reference to the annexed drawings, provided purely by way of non-limiting example and wherein.

DETAILED DESCRIPTION OF THE INVENTION

Figure 1:
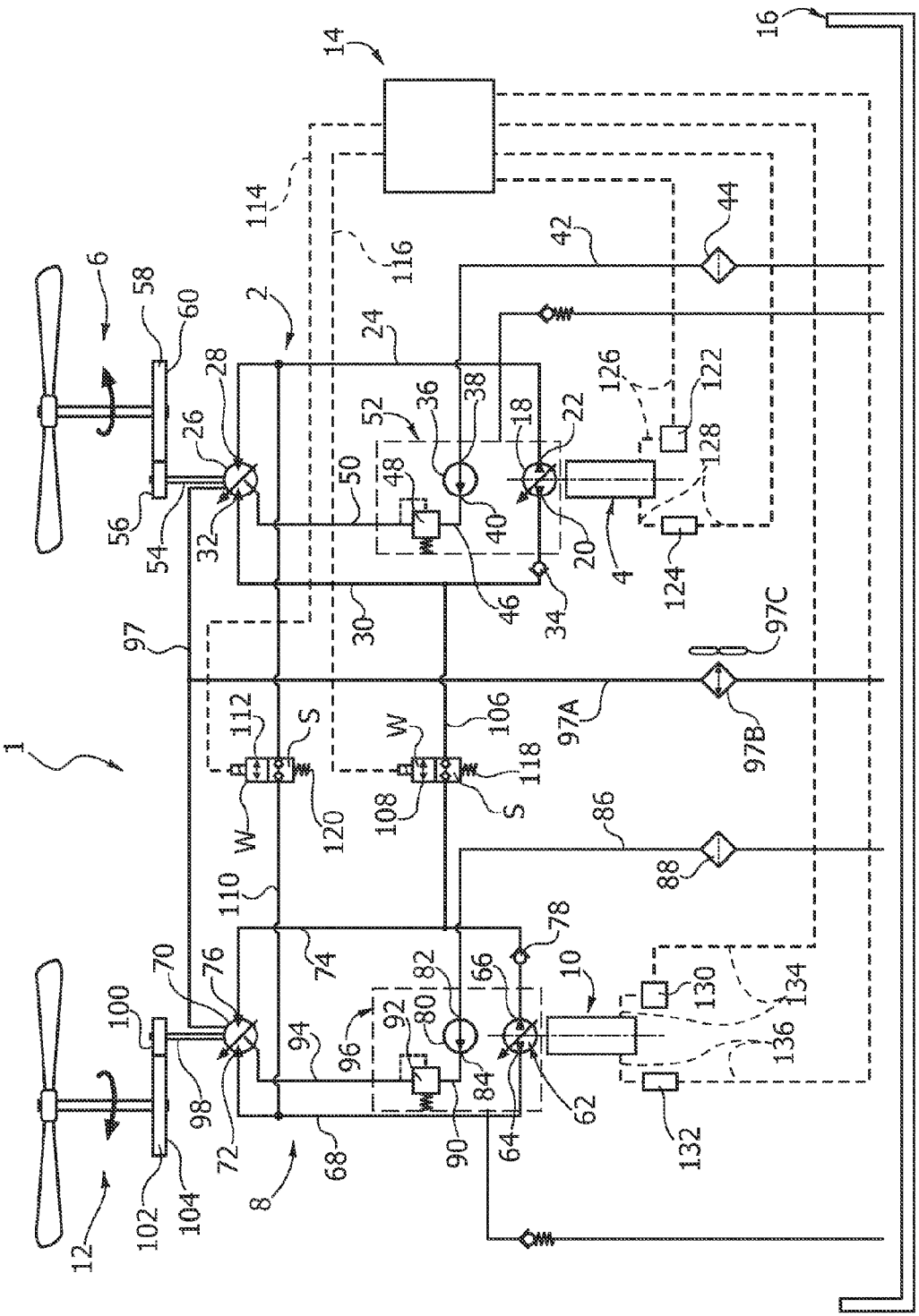
FIG. 1 is a schematic view of a propulsion and motion-transmission assembly according to the present invention.

Designated by 1 in FIG. 1 is a propulsion and motion-transmission assembly according to the present invention.

The assembly 1 comprises a first hydrostatic transmission 2, a first motor unit, in particular a first gas turbine 4, a first rotor 6, a second hydrostatic transmission 8, a second motor unit, in particular a second gas turbine 10, a second rotor 12, an electronic control unit 14, and a tank 16.

The first hydrostatic transmission 2 comprises a first fluid machine for converting mechanical energy into fluid energy, in particular a variable-displacement hydraulic pump 18 (referred to in what follows, for brevity, as "pump 18") preferably with two-way flow. The hydraulic pump 18 is connected in rotation to a shaft of the turbine 4 and comprises a suction port 20 and a delivery port 22.

The delivery port 22 is hydraulically connected, by means of a hydraulic line 24, to a first fluid machine for converting fluid energy into mechanical energy, in particular a first hydraulic motor 26 with variable displacement (referred to in what follows, for brevity, as "motor 26" or "hydraulic motor 26"); more precisely, it is connected to an inlet portport 28 thereof.

The suction port 20 is hydraulically connected by means of a hydraulic line 30 to a discharge port 32 of the hydraulic motor 26. Installed on the hydraulic line is a check valve 34 designed to enable a flow of fluid only from the discharge port 32 of the hydraulic motor 26 to the suction port 20 of the pump 18. The hydraulic lines 24, 30 are functionally two different entities with a precise operative mission.

In particular, the man skilled in the art will appreciate that the hydraulic line 24 that connects the delivery port 22 of the pump 18 to the intake port 28 of the hydraulic motor 26 defines a high-pressure branch of the hydrostatic transmission 2 since it connects power ports through which fluid flows at high pressure. For this reason, in the ensuing description the hydraulic line 24 will be designated also by the term "high-pressure branch 24".

The hydraulic line 30 is, instead, functionally a low-pressure branch of the hydrostatic transmission 2, since it connects power ports through which fluid flows at low pressure. In fact, the hydraulic line 30 hydraulically connects the discharge port 32 of the hydraulic motor 26 to the suction port 20 of the pump 18; for this reason in the ensuing description it will be designated also by the term "low-pressure branch 30".

The hydrostatic transmission 2 further comprises a lubrication pump 36 having a suction port 38 and a delivery port 40. The suction port 38 is hydraulically connected to the tank 16 by means of a hydraulic line 42 on which a filter 44 is set. The delivery port 40 of the lubrication pump 36 is hydraulically connected, by means of a hydraulic line 46, to a pressure-reducer valve 48, which is in turn hydraulically connected, by means of a hydraulic line 50, to a lubrication sump (not visible in the schematic representation of FIG. 1) of the motor 28.

The variable-displacement pump 18, the lubrication pump 38, and the pressure-reducer valve 48 define a primary side of the hydrostatic transmission 2, designated as a whole by the reference number 52 and represented schematically with a dashed line. The hydraulic motor 28 defines, instead, a secondary side of the hydrostatic transmission 2 and is moreover connected in rotation to the first rotor 6.

More in detail, the hydraulic motor 26 comprises an output shaft 54 connected in rotation to a first drive pulley 56, which is in turn connected in rotation to a first driven pulley 58 by means of a belt 60. The driven pulley 58 is in turn connected in rotation to the rotor 6.

In this way, the hydraulic motor 26 is pre-arranged for driving in rotation the first rotor 6. It will, on the other hand, be appreciated that the mechanical connection between the hydraulic motor 28 and the first rotor 6 is in no way limited to the choice of pulleys as transmission elements, but any mechanical transmission (for example, a cascade of gears, a chain, etc.) can perform the same function without any substantial difference.

The second hydrostatic transmission 8 is identical to the first hydrostatic transmission 2 and comprises a second fluid machine for converting mechanical energy into fluid energy, in particular a second variable-displacement hydraulic pump 62, preferably with two-way flow, including a delivery port 64 and a suction port 66. The delivery port 64 is hydraulically connected, by means of a hydraulic line 68, to a second fluid machine for converting fluid energy into mechanical energy, in particular a second hydraulic motor with variable displacement 70, which is also preferably with two-way flow. More precisely, the delivery port 64 is hydraulically connected to an inlet port 72 of the hydraulic motor 70.

The suction port 66 is, instead, hydraulically connected, by means of a hydraulic line 74, to a discharge port 76 of the hydraulic motor 70. On the hydraulic line 74 there is moreover installed a check valve 78 arranged for enabling a flow of fluid only from the discharge port 76 of the hydraulic motor 70 to the suction port 66 of the pump 62. The second hydraulic transmission 8 further comprises a second lubrication pump 80 having a suction port 82 and a delivery port 84.

The suction port 82 is hydraulically connected, by means of a hydraulic line 86, to the tank 16. Set on the hydraulic line 86 is a second filter 88 identical to the filter 44. The delivery port 84 is hydraulically connected, by means of a hydraulic line 90, to a second pressure-reducer valve 92, which, in turn, is hydraulically connected to a lubrication sump (not visible in the schematic representation of FIG. 1) of the hydraulic motor 70 by means of a hydraulic line 94.

Like the hydrostatic transmission 2, the pump 62, the lubrication pump 80, and the pressure-reducer valve 92 define a primary side of the hydrostatic transmission 8 designated as a whole by the reference number 96, whilst the variable displacement hydraulic motor 70 defines a secondary side of the hydrostatic transmission 8.

The lubrication sumps of the first and second hydraulic motors 26, 70 are hydraulically connected by means of a channel 97 from which there branches off a hydraulic line 97A, set on which is an air-oil heat exchanger 97B, cooled by means of a fan 97C. The hydraulic line 97A hydraulically connects the sumps of the hydraulic motors 26, 70 to the tank 16.

Nonetheless, the hydraulic line 68 is functionally a high-pressure branch of the hydrostatic transmission 8; for this reason, in the ensuing description it will be designated also by the term "high-pressure branch 68". Likewise, the hydraulic line 74 is functionally a low-pressure branch for the hydrostatic transmission 8; for this reason, it will be designated in the ensuing description also by the term "low-pressure branch 74".

The hydraulic motor 70 further comprises an output shaft 98 connected in rotation to a second drive pulley 100, which is in turn connected in rotation to a second driven pulley 102 by means of a second belt 104. The driven pulley 102 is in turn connected in rotation to the second rotor 12. In this way, the hydraulic motor 70 is arranged for driving in rotation the second rotor 12.

The low-pressure branches 30, 74 are connected by means of a first emergency hydraulic line 106, set on which is a first solenoid valve 108. Likewise, the high-pressure branches 24, 68 are connected by means of a second emergency hydraulic line 110, set on which is a second solenoid valve 112 identical to the solenoid valve 108.

The solenoid valves 108, 112 are operatively connected for their actuation to the electronic control unit 14 by means of respective electrical connections 114, 116. Each solenoid valve 108, 112 comprises two operative positions including a resting position S and a working position W. To the resting position S there corresponds a condition in which the passage of fluid through the emergency hydraulic lines 106, 110 is inhibited, whilst the working positions W are provided for enabling a free flow of fluid through the lines 106, 110. The solenoid valves 108, 112 are kept in the resting position by means of the action of respective elastic contrast elements 118, 120.

The first turbine 4 is operatively connected to a first rotational-speed sensor 122 and to a first temperature sensor 124. The sensors 122, 124 are connected to respective electrical control lines 126, 128 that operatively connect the electronic control unit 14 to the first turbine 4. Likewise, the second turbine 10 is operatively connected to a second rotational-speed sensor 130 and to a second temperature sensor 132. The sensors 130, 132 are moreover connected to respective control lines 134, 136 that connect the electronic control unit 14 to the second turbine 10.

Figure 2:
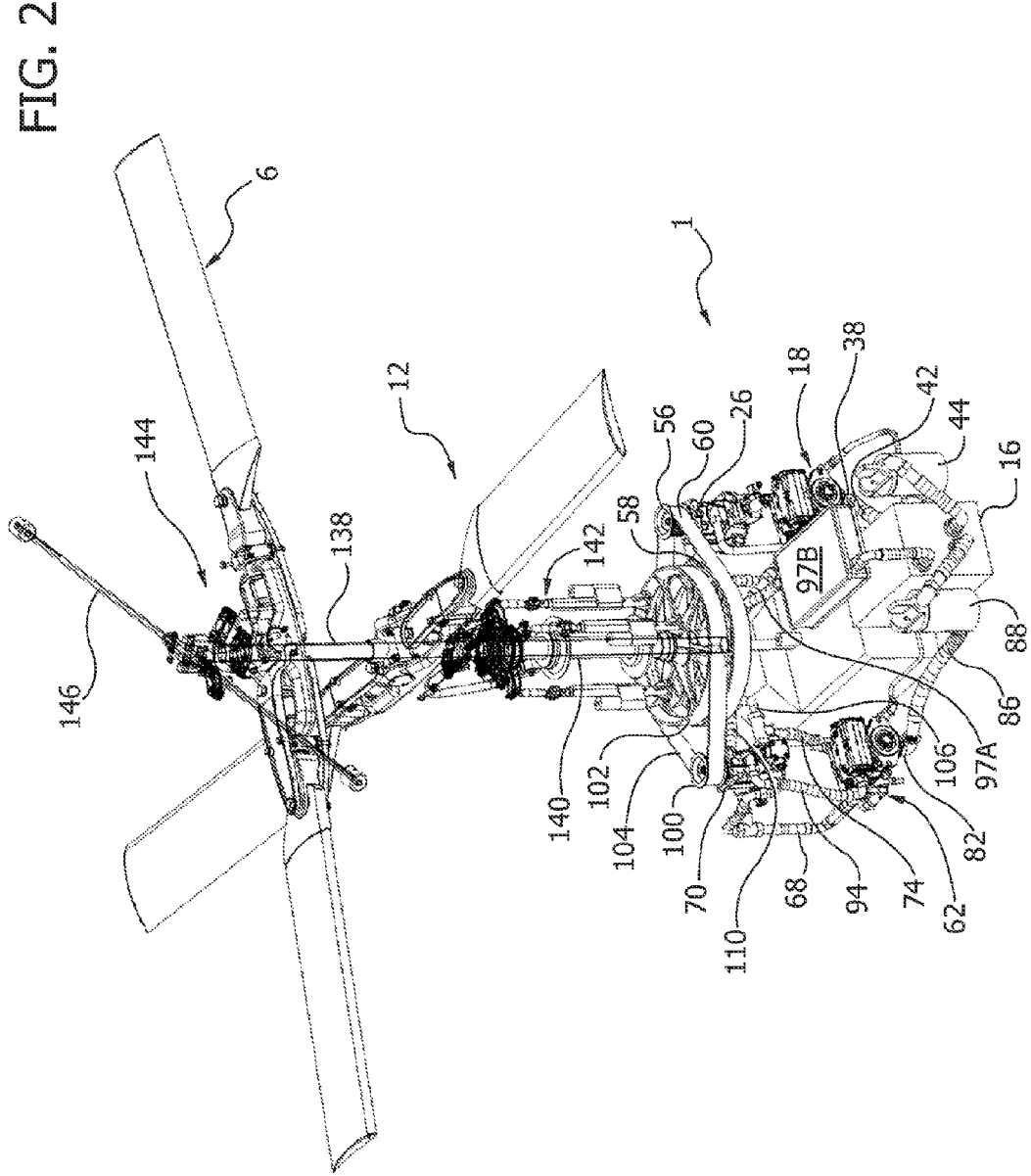
FIG. 2 is a perspective view corresponding to one embodiment of the assembly of FIG. 1.

Illustrated by way of example in FIG. 2 is a preferred embodiment of the present invention, where the components that are identical to those of FIG. 1 are designated by the same reference numbers. The assembly 1 of FIG. 2 comprises the first rotor 6 and the second rotor 12 arranged coaxially with respect to one another, like the respective driven pulleys 58, 104. The rotors 6, 12 are connected in rotation, respectively, to a first transmission shaft 138 and a second transmission shaft 140 traversed by the shaft 138 itself. The transmission shafts 138, 140 are connected in rotation to the pulleys 58, 102 in such a way that the rotors 6, 12 can be driven in rotation, respectively, by means of the motor 26 and the motor 70.

Moreover operatively connected to the rotor 12 is a mechanism for the variation of the cyclic pitch, designated as a whole by the reference number 142, whereas operatively connected to the rotor 6 is a stabilisation mechanism 144 comprising a stabiliser bar 146. The mechanisms 142, 144 are to be considered of a conventional type and will not be described in any further detail hereinafter.

It should moreover be noted that the hydraulic connections between the various components are provided preferably by means of flexible pipes or hoses, which enables exploitation of the advantages referred to in what follows.

Operation of the propulsion and motion-transmission assembly 1 is described in what follows.

With reference to FIG. 1, the first and second rotors 6, 12 are driven in rotation by means of the hydrostatic transmissions 2 and 8, respectively. The gas turbines 4, 10 constitute a motor unit for the respective hydrostatic transmissions 2, 8 to which they are connected. In particular, the turbines 4, 10 drive in rotation the variable-displacement pumps 18, 62 that deliver a flow rate of fluid that is highly pressurized into the high-pressure branches 24, 68, from which it is delivered to the inlet ports 28, 72 of the hydraulic motors 26, 70. These drive in rotation the corresponding drive pulleys 56, 100, by means of which the motion is transferred to the driven pulleys 58, 102 through the respective belts 60, 104 and from the driven pulleys 58, 102 to the respective rotors 6, 12.

The fluid that traverses the hydraulic motors 26, 70 is discharged in the respective low-pressure branches 30, 74 and delivered again to the suction ports 20, 66 of the pumps 18, 62. During operation, the lubrication pumps 36, 80 deliver slightly pressurized fluid to the lubrication sumps of the hydraulic motors 26, 70. Said fluid is then collected in the channel 97 and delivered to the hydraulic line 97A, from which it returns to the tank 16 after being cooled in the heat exchanger 97B.

The variation of the speed of rotation of the rotors 6, 12 is performed in a simple and feasible way by modulation of the displacement of the pumps 18, 62 and of the hydraulic motors 26, 70. In this way, it is possible to exploit the entire torque conversion range of the hydrostatic transmissions 2, 8, and it is moreover possible to eliminate the control of the collective pitch generally present on rotary-wing aircraft since the functions performed thereby are in this case performed by varying the r.p.m. of the hydraulic machines present in the hydrostatic transmissions 2, 8.

The velocity sensors 122, 130 and temperature sensors 124, 132 constantly monitor the performance of the gas turbines 4, 10. The sensors 122, 124, 130, 132 interact constantly with the electronic control unit 14 for managing the propulsion and motion-transmission assembly 1 and for handling any possible failure in operation.

The sequence of operations that can be controlled by the electronic control unit 14 in the case of failure of one of the two gas turbines 4, 10 will now be described.

Supposing that the gas turbine 4 is in a condition of failure and the transmission of mechanical power to the pump 18 consequently ceases, the sensors 122, 124 detect immediately the faults of operation and the presence of critical conditions, transmitting a signal along the electrical control lines 126, 128. From these, the signal reaches the electronic control unit that drives the solenoid valves 108, 112. In particular, in the case of failure of the turbine 4 and hence arrest of the hydrostatic transmission 2, the electronic control unit 14 governs opening of the two solenoid valves 108, 112, bringing both into the respective working position W. In said situation, the solenoid valve 108 sets the low-pressure branches 74, in hydraulic communication, whilst the solenoid valve 112 sets the high-pressure branches 68, 24 in hydraulic communication.

In this way, the flow rate of fluid generated by the pump 62 that is still functioning is delivered in part into the high-pressure branch 68 and in part into the high-pressure branch 24 via the emergency hydraulic line 110. Since the flow rate of fluid that traverses the hydraulic motor 26 cannot be delivered again to the suction port 20 of the pump 18 (in so far as the latter is blocked on account of the failure of the turbine 4), it is delivered from the low-pressure branch 30 directly to the low-pressure branch 74 and the suction port 66 thanks to the emergency hydraulic line 106. It should be noted that operation of the assembly 1 in the case of failure of the turbine 10 is identical, with the obvious difference in the direction of the flow rate going from one hydrostatic transmission to the other. In this case, in fact, it would be the pump 18 that delivers part of its flow rate to the high-pressure branch 68 thanks to the emergency hydraulic line 110 and the solenoid valve 112, whilst the same flow rate (but for the inevitable leaks) would be discharged directly towards the low-pressure branch 30 through the solenoid valve 108.

Hence, the solenoid valves 108, 112 are arranged for enabling, respectively, a first hydraulic connection between the low-pressure branches 30, 74 through the first emergency hydraulic line 106 and a second hydraulic connection between the high-pressure branches 24, 68 through the second emergency hydraulic line 110. Basically, in the event of a failure of one of the two gas turbines, which prevents operation of the primary side of the hydrostatic transmission connected thereto, the gas turbine and the hydrostatic transmission still functioning can be used for restoring the operation of the hydrostatic transmission that has failed, thus enabling the aircraft to be kept under control. Hence, the propulsion and motion-transmission assembly 1 has an intrinsically redundant internal structure. Of course, each of the two gas turbines 4, 10 must be sized in such a way as to be able to satisfy the power request of the two hydraulic motors 26, 70 in the event of a failure of one of them.

The strategy described above can be applied with minimal variations also in the event of a failure of one of the pumps 18, 62: in this case, the electronic control unit 14 can be arranged for connection and co-operation with further sensors (for example, pressure and flow-rate sensors, operatively connected to the hydrostatic transmissions 2, 8) and can be arranged for issuing a command for the shutdown of the gas turbine that drives in rotation the hydraulic pump that has failed and, at the same time, switching the solenoid valves 108, 112 into the working position W for enabling the hydraulic connections between the low-pressure branches 30, 74 and the high-pressure branches 24, 68, respectively.

In the event of a failure of one of the two hydraulic motors 26, 70, the sequence of operations is different from the one described in the case of failure of one of the gas turbines 4, 10. In fact, in this case, it would be useless, and even dangerous, to enable a hydraulic connection between the hydrostatic transmissions 2, 8 since the hydraulic motor that has failed cannot handle the flow that would be delivered to it properly. For this reason, in the event of a failure of one of the two hydraulic motors there is immediately issued a command for annulling the displacement of both of the hydraulic motors 26, 70. In this way, both of the hydraulic motors are subject to a load of a driving type represented by the corresponding rotors 6, 12. However, given that their displacement has been annulled as described previously, the resistant torque that they offer with respect to the free rotation of the motors 6, 12 is substantially zero (neglecting the minor friction torque of the machine). In this way, the blades of the rotors can function in autorotation regime thanks to the aerodynamic forces acting thereon, without any appreciable resistant effect exerted by the hydraulic motors 26, 70. As is known to the person skilled in the art, in the autorotation regime it is possible to control the descent of the aircraft to the ground.

The propulsion and motion-transmission assembly 1 according to the present invention presents a series of evident advantages.

First, the variation of r.p.m. of the rotors 6, 12 can be performed in a considerably simpler way as compared to devices of a known type, since it is sufficient to act on the control of the displacement of the pumps 18, 62 of the hydraulic motors 26, 70, which consists in a simple command for shifting a control device of the displacement of the fluid machines just mentioned, an operation that is decidedly less complex than regulation of a gas turbine.

Thanks to the feasibility and simplicity with which it is possible to vary the r.p.m. of the rotors 6, 12, it is possible to forgo a command of the collective pitch of the blades of the rotors 6, 12, as a whole lightening the structure. In fact, the variation of the lift of the blades is obtained exclusively by varying the r.p.m. of the rotors 6, 12. Furthermore, it is possible to increase the speed of translation of the aircraft to a considerable extent as compared to aircraft of a known type, where the main limit to the speed of advance is generally not represented by the power of the propulsion system but by the conditions of flow that concern the blades of the rotors.

In fact, in the case where the flow on the blade occurs at a sonic regime, there is a significant reduction of the lift, which jeopardizes flight safety. Since the velocity of the fluid current that impinges upon each of the blades of the rotors 6, 12 has a component represented by the peripheral velocity of the blade itself and a component due to the translation of the aircraft in the air, by reducing the velocity of rotation of the rotors in the way described previously the component linked to the peripheral velocity of the blade is reduced, moving the latter away from conditions of sonic flow and preventing onset of phenomena of transonic flutter.

The assembly 1 has a substantially modular structure comprising a motor unit, in the case in point a gas turbine, and a hydrostatic transmission that connects a resistant load, in the case in point a rotor, to the motor unit. The interposition of a hydrostatic transmission between the load and the motor unit enables decoupling of the harmonic motions of the rotor with respect to the movement of the motor unit, which in this way is substantially undisturbed even in the presence of harmonic motions of significant amplitude during operation of the rotors 6, 12.

In this way, the gas turbines 4, 10 can present a regularity of operation that it is generally impossible to achieve with a traditional mechanical transmission.

Furthermore, with reference to FIG. 2, the architecture of the assembly 1 is extremely feasible as compared to solutions of a known type. In fact, as illustrated in FIG. 2, the channels and the hydraulic lines are provided by means of flexible pipes or hoses that can be set according to the requirements within the body of the aircraft, without the constraints typical of mechanical transmissions. In addition, the configuration proves also decidedly compact, and the only element that presents significant encumbrance and for which positioning is less feasible is a kerosene tank that supplies the gas turbines 4, 10.

It should moreover be noted that the feasibility in the arrangement of the components of the assembly 1 not only enables greater freedom in the design of the fuselage or of the body of the aircraft, but moreover enables improved distribution of the weights as a function of the dynamic characteristics that it is intended to bestow on the aircraft itself.

The assembly 1 according to the present invention can be applied indifferently to a traditional rotary-wing aircraft such as a helicopter or can form part of a flight module that can be applied to vehicles designed for movement on the ground. In this latter event, all the advantages described in terms of compactness and feasibility in the location of the components assume particular importance.

Finally, although an embodiment wherein each hydraulic motor 26, 70 is arranged for driving in rotation a respective rotor has been described herein, the assembly 1 can be indifferently applied to rotary-wing aircraft (or to flight modules for land vehicles) in which a single main rotor with vertical axis and a tail rotor are present. In this case, both of the output shafts 54, 98 can be connected in rotation to the vertical-axis rotor for example by means of a gear transmission, in which instead of the pulleys 56, 100 two pinions can be used, which in turn mesh with a crown wheel connected in rotation to the main rotor. Possibly, giving up in this way part of the feasibility of the assembly 1 a mechanical transmission of the motion to the tail rotor can be provided, taking the motion from the crown wheel connected in rotation to the main rotor. Otherwise, according to the applications it is also possible to envisage a separate actuation for the tail rotor, leaving to the assembly 1 only the task of driving the main rotor in rotation.

Of course, without prejudice to the principle of the invention, the details of construction and the embodiments may vary widely with respect to what has been described and illustrated herein purely by way of example, without thereby departing from the scope of protection of the present invention, as defined by the annexed claims.

The invention claimed is:

1. A propulsion and motion-transmission assembly, for a rotary-wing aircraft, comprising:
   a first hydrostatic transmission including a first fluid machine for converting mechanical energy into fluid energy and a first fluid machine for converting fluid energy into mechanical energy;
   a first motor unit arranged for the actuation of said first fluid machine for converting mechanical energy into fluid energy;
   a second hydrostatic transmission including a second fluid machine for converting mechanical energy into fluid energy and a second fluid machine for converting fluid energy into mechanical energy; and
   a second motor unit arranged for the actuation of said second fluid machine for converting mechanical energy into fluid energy;
   wherein said first and second fluid machines for converting fluid energy into mechanical energy are arranged for driving in rotation at least one rotor of a rotary-wing aircraft,
   wherein each of said first and second hydrostatic transmissions comprises a high-pressure branch and a low-pressure branch which, in each of said first and second hydrostatic transmissions, hydraulically connect the fluid machine for converting mechanical energy into fluid energy to the fluid machine for converting fluid energy into mechanical energy,
   said assembly comprising valve means that can be actuated for enabling a first hydraulic connection between the low-pressure branch of said first hydrostatic transmission and the low-pressure branch of said second hydrostatic transmission and a second hydraulic connection between the high-pressure branch of said first hydrostatic transmission and the high-pressure branch of said second hydrostatic transmission.

2. The assembly according to claim 1, wherein said first and second fluid machines for converting mechanical energy into fluid energy are a first hydraulic pump and a second hydraulic pump, and in that said first and second fluid machines for converting fluid energy into mechanical energy are a first hydraulic motor and a second hydraulic motor.

3. The assembly according to claim 2, further comprising an electronic control unit co-operating with sensor means operatively connected to said first and second motor units and arranged for the actuation of said first and second solenoid valves.

4. The assembly according to claim 3, wherein said sensor means comprise, for each of said first and second motor units, a rotational-speed sensor and a temperature sensor.

5. The assembly according to claim 2, wherein said first and second hydraulic pumps have variable displacement.

6. The assembly according to claim 2, wherein said first and second hydraulic motors have variable displacement.

7. The assembly according to claim 1, wherein said valve means comprise a first solenoid valve and a second solenoid valve set, respectively, on a first emergency hydraulic line and a second emergency hydraulic line, wherein said first emergency hydraulic line connects the low-pressure branch of said first hydrostatic transmission to the low-pressure branch of said second hydrostatic transmission, and wherein said second emergency hydraulic line connects the high-pressure branch of said first hydrostatic transmission to the high-pressure branch of said second hydrostatic transmission.

8. The assembly according claim 1, wherein said first motor unit is a first gas turbine and in that said second motor unit is a second gas turbine.

9. The assembly according to claim 1, wherein each of said first and second fluid machines for converting fluid energy into mechanical energy comprises a respective output shaft, wherein the output shaft of said first fluid machine for converting fluid energy into mechanical energy is arranged for the connection in rotation to a first rotor of a rotary-wing aircraft, and in that the output shaft of said second fluid machine for converting fluid energy into mechanical energy is arranged for the connection in rotation to a second rotor of said rotary-wing aircraft, wherein said first and second rotors are preferably coaxial with one another.

10. A rotary-wing aircraft comprising a propulsion and motion-transmission assembly, the assembly comprising:
    a first hydrostatic transmission including a first fluid machine for converting mechanical energy into fluid energy and a first fluid machine for converting fluid energy into mechanical energy;
    a first motor unit arranged for the actuation of said first fluid machine for converting mechanical energy into fluid energy;
    a second hydrostatic transmission including a second fluid machine for converting mechanical energy into fluid energy and a second fluid machine for converting fluid energy into mechanical energy; and
    a second motor unit arranged for the actuation of said second fluid machine for converting mechanical energy into fluid energy;
    wherein said first and second fluid machines for converting fluid energy into mechanical energy are arranged for driving in rotation at least one rotor of a rotary-wing aircraft,
    wherein each of said first and second hydrostatic transmissions comprises a high-pressure branch and a low-pressure branch which, in each of said first and second hydrostatic transmissions, hydraulically connect the fluid machine for converting mechanical energy into fluid energy to the fluid machine for converting fluid energy into mechanical energy,
    said assembly comprising valve means that can be actuated for enabling a first hydraulic connection between the low-pressure branch of said first hydrostatic transmission and the low-pressure branch of said second hydrostatic transmission and a second hydraulic connection between the high-pressure branch of said first hydrostatic transmission and the high-pressure branch of said second hydrostatic transmission.

* * * * *